United States Patent
Ayabe et al.

(10) Patent No.: US 7,549,946 B2
(45) Date of Patent: Jun. 23, 2009

(54) SHIFT CONTROL APPARATUS AND SHIFT CONTROL METHOD OF AUTOMATIC TRANSMISSION OF VEHICLE

(75) Inventors: Atsushi Ayabe, Nagoya (JP); Ayumu Sagawa, Toyota (JP); Toshio Sugimura, Nagoya (JP); Toshinari Suzuki, Nishikamo-gun (JP); Hisashi Ishihara, Toyoake (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 385 days.

(21) Appl. No.: 11/495,727

(22) Filed: Jul. 31, 2006

(65) Prior Publication Data

US 2007/0049458 A1 Mar. 1, 2007

(30) Foreign Application Priority Data

Aug. 29, 2005 (JP) ............................. 2005-247859

(51) Int. Cl.
*B60W 10/06* (2006.01)
*B60W 10/10* (2006.01)
(52) U.S. Cl. ...................................... 477/107; 477/109
(58) Field of Classification Search ................. 477/109, 477/107, 101, 102
See application file for complete search history.

(56) References Cited

U.S. PATENT DOCUMENTS

| | | | |
|---|---|---|---|
| 5,012,695 A * | 5/1991 | Kyohzuka et al. | 477/102 |
| 2003/0022756 A1 * | 1/2003 | Ayabe et al. | 477/109 |
| 2007/0287588 A1 * | 12/2007 | Steinhauser et al. | 477/109 |
| 2007/0287591 A1 * | 12/2007 | Steinhauser et al. | 477/121 |
| 2008/0064566 A1 * | 3/2008 | Lee | 477/109 |

FOREIGN PATENT DOCUMENTS

| | | |
|---|---|---|
| DE | 36 25 156 A1 | 2/1987 |
| DE | 42 10 626 A1 | 10/1993 |
| JP | 5-99322 | 4/1993 |
| JP | 8-244499 | 9/1996 |
| JP | 9-291835 | 11/1997 |
| JP | 10-281277 | 10/1998 |
| JP | 2002-30951 | 1/2002 |
| KR | 10-0459744 | 12/2004 |

* cited by examiner

*Primary Examiner*—Sherry Estremsky
(74) *Attorney, Agent, or Firm*—Oblon, Spivak, McClelland, Maier & Neustadt, P.C.

(57) ABSTRACT

The invention relates to a shift control apparatus for an automatic transmission, that executes a torque reduction control when the transmission executes a second downshift in response to a second downshift determination made during first downshift. The shift control apparatus includes a multiple shift execution unit that starts the second downshift operation in response to the second downshift determination, and a torque reduction control execution unit that executes a torque reduction control when the rotational speed of the input member is increased to at least a predetermined first determination speed, which is determined in accordance with a shift ratio of a gear stage after the second downshift operation, after the second downshift starts. This allows the rotational speed of the input shaft to be quickly changed to the appropriate synchronous rotational speed. Thus, the desired driving force is provided upon completion of the second downshift without overspeeding the engine.

8 Claims, 8 Drawing Sheets

|  | C1 | C2 | B1 | B2 | B3 |
|---|---|---|---|---|---|
| 1st | ○ |  |  | ○ |  |
| 2nd | ○ |  | ○ |  |  |
| 3rd | ○ |  |  |  | ○ |
| 4th | ○ | ○ |  |  |  |
| 5th |  | ○ |  |  | ○ |
| 6th |  | ○ | ○ |  |  |
| Rev |  |  |  | ○ | ○ |

SHIFT CONTROL APPARATUS AND SHIFT CONTROL METHOD OF AUTOMATIC TRANSMISSION OF VEHICLE

The disclosure of Japanese Patent Application No. 2005-247859, filed on Aug. 29, 2005, including the specification, drawings and abstract, is incorporated herein by reference in its entirety.

BACKGROUND OF THE INVENTION

1. Field of the Invention

The invention relates to a shift control apparatus and shift control method for an automatic transmission, which executes a torque reduction control when downshifting in response to a second downshift determination made during a first downshift.

2. Description of Related Art

Japanese Patent Publication Laid-Open No. 10-281277 describes a shift control for an automatic transmission that executes a shifting of a rotation transferred from an engine to an input member so as to be output to drive wheels. During a first downshift, in which a first friction coupling device is engaged, the operation of the accelerator by the driver may cause a second downshift command to be output. When the transmission executes the second downshift, the first friction-coupling device is disengaged and a second friction-coupling device is engaged. Accordingly, the engine may overspeed, and the second downshift cannot be performed appropriately. The described shift control addresses this problem by delaying the downshift, in spite of the downshift command, for a predetermined time. In addition, Japanese Patent Publication Laid-Open No. 8-244499 describes the technology for starting a downshift, which disengages the first friction-coupling device and engages the second friction-coupling device, when the downshift determination is made during an initial shift that engaged the first friction-coupling device, through the accelerator pedal operation. Then, the torque reduction control for reducing the torque of the engine is executed during the downshift to prevent the overspeeding of the engine and reduce shift shock.

In Japanese Patent Publication Laid-Open No. 10-281277, because the second downshift is delayed, there is a lag between the operation of the accelerator pedal and output of the desired driving force through the second downshift operation. Meanwhile, in Japanese Patent Publication Laid-Open No. 8-244499, the downshift operation starts immediately in response to the downshift command and the torque reduction control is executed simultaneously. The downshift operation is then performed under the condition where the torque of the power source is suppressed. Accordingly, much time is taken for the rotational speed of the input member to increase to the synchronous rotational speed of a gear stage after the downshift operation. This also results in a time lag between operation of the accelerator pedal operation and output of desired driving force.

SUMMARY OF THE INVENTION

It is an object of the invention to provide a shift control apparatus and shift control method for a vehicular automatic transmission that executes a torque reduction control during a second downshift operation in response to a second downshift determination that is made during a first downshift operation, for changing the rotational speed of the input member to a synchronous rotational speed quickly while preventing overspeeding of the engine. The desired driving force may be obtained quickly upon completion of the second downshift.

An aspect to the invention relates to a shift control apparatus that executes a shift control of an automatic transmission that changes a speed of a rotation transferred from a power source to an input member and outputs the rotation to a drive wheel. In response to a second downshift determination made during a first downshift, which engages a first friction coupling device, the shift control apparatus performs a second downshift, which disengages the first friction coupling device, and engages a second friction coupling device. The shift control apparatus is provided with (a) a multiple shift execution unit that starts the second downshift operation in response to the second downshift determination, and (b) a torque reduction control execution unit that executes a torque reduction control, after the second downshift starts, to reduce the torque output of the engine when the rotational speed of the input member is increased to at least a predetermined first determination speed, which is lower than a synchronous rotational speed, determined in accordance with a shift ratio of a gear stage after the second downshift operation.

In the shift control apparatus according to the invention, (a) the power source may comprise an internal combustion engine with an electronically controlled throttle valve; and (b) the torque reduction control execution unit executes a control to reduce the opening degree of the throttle valve so that the engine only outputs sufficient torque to increase the rotational speed of the input member to the synchronous rotational speed.

In the shift control apparatus, the torque reduction control execution unit may end the torque reduction control when satisfying a return condition that the rotational speed of the input member exceeds a predetermined second determined second determination speed higher than the synchronous rotational speed, next, the rotational speed of the input member decreases for a predetermined time period, and the rotational speed of the input member reaches to be lower than a predetermined third determination speed, which is higher than the synchronous rotational speed.

In the shift control apparatus, the torque reduction control execution unit may forcibly end the torque reduction control when the torque reduction control termination condition is not satisfied for at least a predetermined time period.

According to the aspect of the invention, the second downshift operation starts in response to the second downshift determination. Then the torque reduction control is kept in a stand-by state until the rotational speed of the input member becomes equal to or higher than the first determination speed, which is lower than the synchronous rotational speed. The torque of the power source allows the rotational speed of the input member to be increased quickly, and, when the rotational speed reaches the first determination speed, the torque reduction control is started. This makes it possible to obtain the desired driving force by performing the second downshift operation quickly while preventing overspeeding of the engine.

According to the aspect of the invention, the power source may be an engine with an electronically controlled throttle valve, which may be controlled to reduce the opening degree of the throttle valve so that the engine only outputs sufficient torque to increase the rotational speed of the input member to the synchronous rotational speed. This allows the engine torque to increase the rotational speed of the input member to the synchronous rotational speed further quickly while preventing the overspeeding of the engine, resulting in excellent shift response.

According to the aspect of the invention, the torque reduction control ends when the rotational speed of the input member exceeds the second determination speed, which is higher than the synchronous rotational speed, and then decreases to be lower than the third determination speed, and the rotational speed of the input member decreases for a predetermined period. This makes it possible to start generating the torque quickly upon completion of the second downshift while preventing overspeeding the engine when the torque reduction control ends. Especially, the torque reduction control termination condition is set to be established when the rotational speed of the input member is decreasing for a predetermined period. This may prevent the accidental termination of the torque reduction control owing to noise caused by the fluctuation of the rotation, thus further preventing the overspeeding of the engine.

According to the aspect of the invention, if the torque reduction control termination condition is not been established over a predetermined time or longer, the torque reduction control is ended. This makes it possible to prevent the reduced torque operation of the power source from continuing for an extended time due to the abnormality during the second downshift to end the downshift even if the torque reduction control termination condition is not satisfied.

The aspect of the invention is preferably applied to an automatic transmission of planetary gear type in which a plurality of gear stages are established in accordance with the operation states of a plurality of clutches and brakes. Likewise, it may also be applied to a staged parallel axes type automatic transmission which will be brought into a neutral state owing to the delay in engagement of the second friction coupling device when performing the second downshift operation during the first downshift operation.

The input member of the automatic transmission may be the turbine shaft of a torque converter when the power is transferred from the engine via the torque converter, and may be the motor shaft of an electric motor when the power is transferred from an electric motor. The power source may be an engine, an electric motor, or the like.

Preferably, the first and the second friction coupling devices may be of the hydraulic type such that, for example, the engagement pressure is changed in accordance with a predetermined change pattern under the hydraulic control by operating the solenoid valve or by operation of the accumulator, for example. However, other friction coupling devices, such as those of the electromagnetic type may be used. The friction coupling devices as described above may include, but are not limited to, single plate clutches, multiplate disc clutches, brakes, belt type brakes, and the like.

The invention may be applied in situations where a second downshift determination is made in accordance with a shift map during a first downshift. For example, the transmission may be making a first downshift in response to a first downshift determination, made in accordance with the shift map, when the vehicle is reducing speed while coasting (accelerator pedal OFF). Operation of the accelerator pedal (accelerator pedal ON) during the first downshift operation may result in a second downshift determination to be made in accordance with the shift map. The second downshift determination may also be made in response to the downshift command such as, for example, a shift lever operation during the first downshift operation with the accelerator pedal set ON.

The first downshift operation may be performed in an arbitrary manner so long as at least the first friction-coupling device is engaged. Alternatively, it may engage the first friction-coupling device while disengaging a third friction-coupling device. The multiple shift execution unit, which starts the second downshift in response to the second downshift determination made during the first downshift, may immediately start disengaging the first friction coupling device, and engaging the second friction coupling device at a predetermined timing that is set in consideration for the shift response, shift shock, and the like.

The first, the second, and the third determination speeds may be set to the values each obtained by subtracting or adding a predetermined value from or to each of the synchronous rotational speeds. Alternatively it may be obtained by subtracting or adding the predetermined value calculated from an equation or data map in which the downshift pattern, the rotational speed of the power source, and the oil temperature when starting the downshift are set as parameters. The second and the third determination speeds may be set to the different rotational speeds, or set to the same rotational speeds.

In the aspect of the invention, the throttle valve opening degree that allows the engine to output the torque to increase the rotational speed of the input member to the synchronous rotational speed may be preliminarily set to a constant value. It may be calculated from the equation or the data map in which the downshift pattern, and oil temperature, and the like, are set as parameters. In the aspect of the invention, the engine is employed as the power source. In the case where the electric motor is employed as the power source, it may be structured to control the electric motor torque such that the rotational speed of the input member is increased by the electric motor to the synchronous rotational speed. In the aspect of the invention, various types of process may be employed for reducing the torque of the power source, for example, by setting the torque of the power source such as the engine to zero.

In the aspect of the invention, the torque reduction control termination condition may be established when the rotational speed of the input member exceeds the second determination speed that is higher than the synchronous rotational speed, and decreases to be lower than the third determination speed that is higher than the synchronous rotational speed while continuing to decrease for a predetermined period. Various types of the return condition may be set such that the process ends upon establishment of the torque reduction control termination condition that the rotational speed of the input member exceeds the second determination speed, and decreases to be lower than the third determination speed.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE INVENTION

An embodiment of the invention will be described referring to the drawings.

Figure 1:
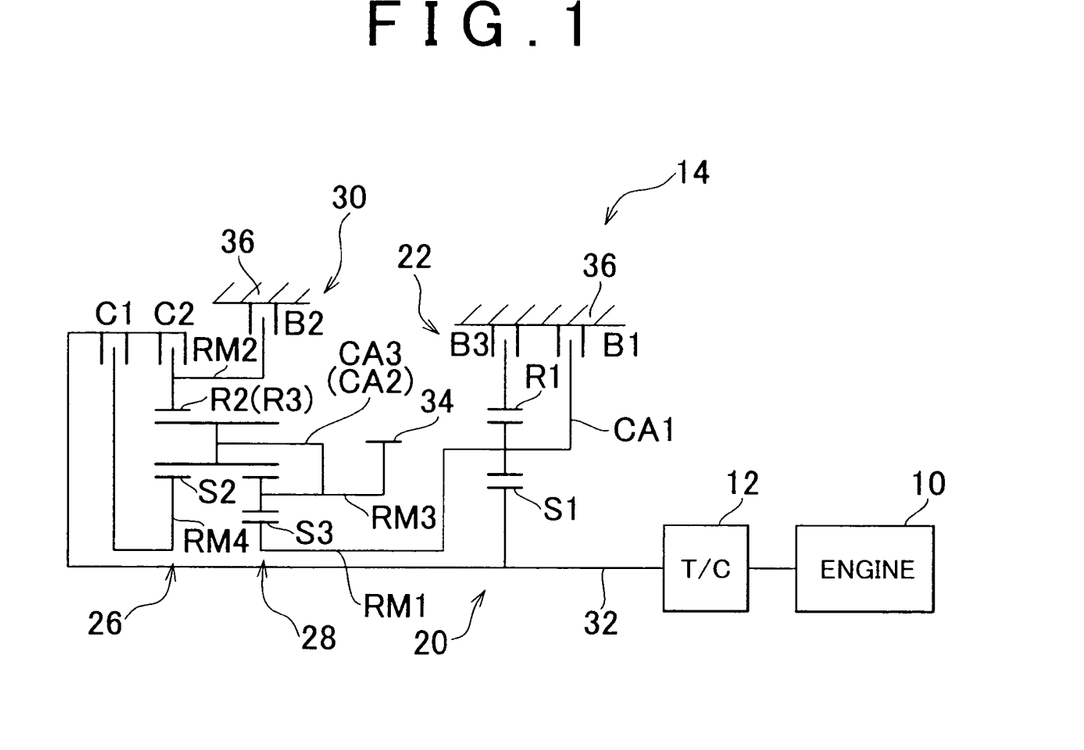
FIG. 1 is a schematic view of a structure of a vehicular drive unit to which the invention is applied.

FIG. 1 shows an outline of a drive unit for an FF (Front engine, Front drive) vehicle in which the engine is transversely mounted. The output of the internal combustion engine 10, for example, such as a gasoline engine, is transferred from a differential gear unit (not shown) to the front wheels via a torque converter 12, and an automatic transmission 14. The engine 10 is employed as the power source for driving the vehicle, and the torque converter 12 is employed as a fluid coupling.

The automatic transmission 14 includes a first shift portion 22, mainly formed of a first planetary gear unit 20 of single pinion type, and a second shift portion 30, mainly formed of a second planetary gear unit 26 of single pinion type, and a third planetary gear unit 28, of double pinion type coaxially arranged such that the rotation of an input shaft 32 is shifted to be output from an output gear 34. The input shaft 32 corresponds to the input member as a turbine shaft of the torque converter 12. The output gear 34 corresponds to the output member that rotates the left and right drive wheels via the differential gear unit. Because the automatic transmission 14 is divided into upper and lower sections symmetrical with respect to a center axis, and in FIG. 1, the lower section is not shown.

The first planetary gear unit 20 that constitutes the first shift portion 22 includes three rotating elements, that is, a sun gear S1, a carrier CAI, and a ring gear R1. The sun gear S1 is connected to the input shaft 32 so as to be driven to rotate, and the ring gear R1 is fixed to a case 36 via a third brake B3 so as not to rotate. Then the carrier CA1, serving as an intermediate output member, is rotated at a reduced speed with respect to the input shift 32 for outputting. The second planetary gear unit 26 and the third planetary gear unit 28, which constitute the second shift portion 30, are partially connected with each other to form four rotating elements RM1 to RM4. Specifically, the sun gear S3 of the third planetary gear unit 28 constitutes the first rotating element RM1, and the ring gear R2 of the second planetary gear unit 26 and the ring gear R3 of the third planetary gear unit 28 are connected with each other to constitute the second rotating element RM2. The carrier CA2 of the second planetary gear unit 26 and the carrier CA3 of the third planetary gear unit 28 are connected with each other to constitute the third rotating element RM3. The sun gear S2 of the second planetary gear unit 26 constitutes the fourth rotating element RM4. The carriers CA2 and the CA3 of the second and the third planetary gear units 26 and 28 are formed of common members, and the ring gears R2 and R3 thereof are also formed of common members. The pinion gear of the second planetary gear unit 26 serves as the second pinion gear of the third planetary gear unit 28 in the form of Ravigneaux type planetary gear train.

The rotation of the first rotating element RM1 (sun gear S3) may be stopped by selectively connecting the first rotating element RM1 to the case 36 by a first brake B1. The rotation of the second rotating element RM2 (ring gears R2 and R3) may be stopped by selectively connecting the second rotating element RM2 to the case 36 by a second brake B2. The fourth rotating element RM4 (sun gear S2) is selectively connected to the input shaft 32 via the first clutch C1. The second rotating element RM2 (ring gears R2 and R3) is selectively connected to the input shaft 32 via the second clutch C2. The first rotating element RM1 (sun gear S3) is integrally connected to the carrier CA1 of the first planetary gear unit 20 as the intermediate output member. The third rotating element RM3 (carriers CA2 and CA3) is integrally connected to the output gear 34 so as to output the rotation.

Figure 2:
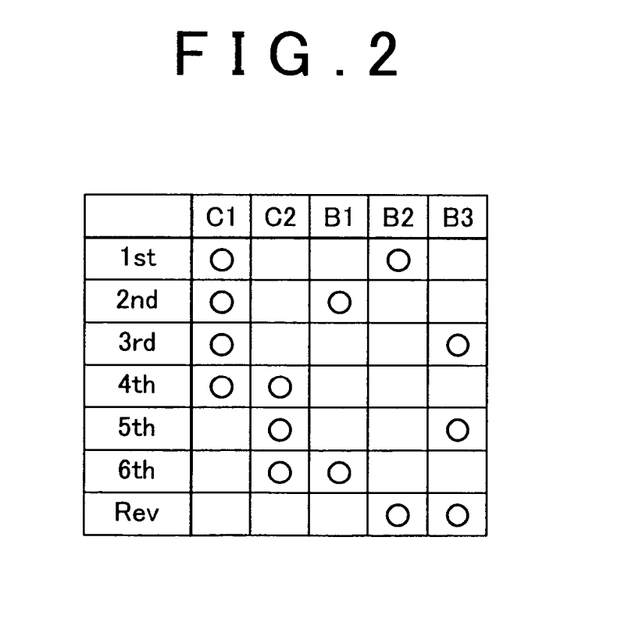
FIG. 2 is a graph that shows engagement and disengagement states of clutches and brakes for establishing the respective gear stages of the automatic transmission as shown in FIG. 1.
Figure 3:
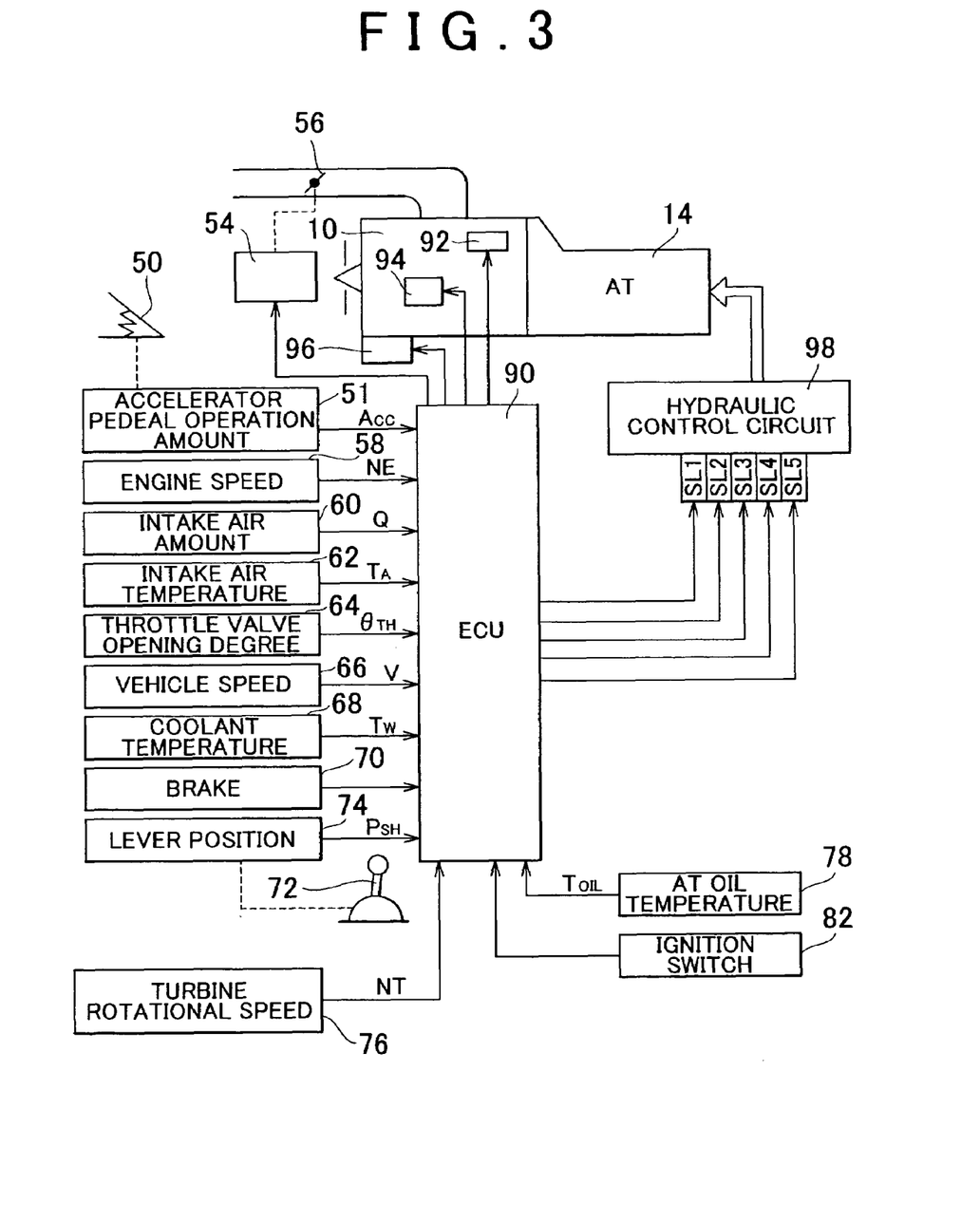
FIG. 3 is a view showing input/output signals processed by an electronic control unit provided for a vehicle according to the embodiment of the invention as shown in FIG. 1.

The clutches, C1, C2, and the brakes B1, B2, and B3 (hereinafter generally referred to as the clutch C and the brake B when no distinction between particular clutches or brakes is required) are hydraulic friction coupling devices that are engaged or disengaged by a hydraulic actuator, for example, the multiple disc clutch and the band brake. A hydraulic circuit is switched by supplying/not supplying electricity to linear solenoid valves SL1 to SL5 of a hydraulic control circuit 98 (FIG. 3), or by operating a manual valve (not shown) so as to select between the engaged state and the disengaged state of the clutch C and the brake B as shown in FIG. 2. Each of six forward stages, and one reverse stage are established in accordance with the operating position of a shift lever 72 (FIG. 3). Referring to FIG. 2, the terms "1st" to "6th" represent the 1st to the 6th forward gear stages, "Rev" represents the reverse gear stage. The gear ratios (=rotational speed of the input shaft $N_{IN}$/rotational speed of the output shaft $N_{OUT}$) is appropriately defined by gear ratios $\rho1$, $\rho2$, $\rho3$ of the first, the second, and the third planetary gear units 20, 26, 28, respectively. The mark "O" in FIG. 2 represents the engaged state, and a blank represents the disengaged state.

Figure 4:
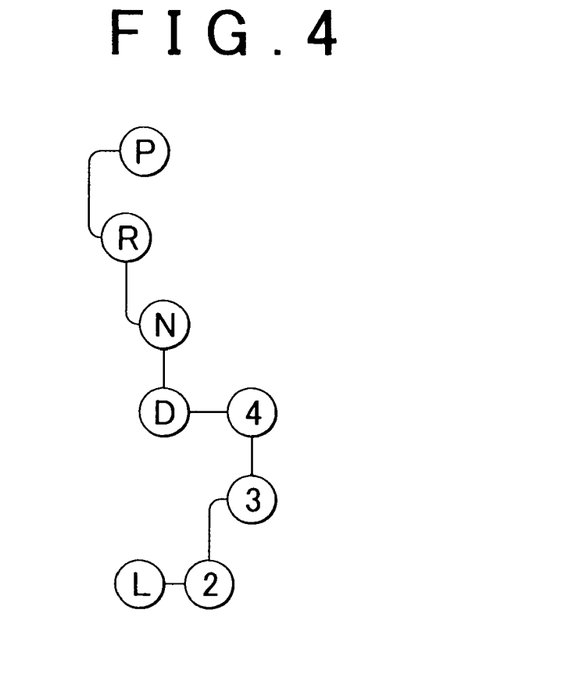
FIG. 4 is a view that shows an example of a shift pattern performed by a shift lever shown in FIG. 3.

The shift lever 72 may be switched to the respective positions in accordance with a shift pattern shown in FIG. 4, for example, including a parking position "P", a reverse position "R", a neutral position "N", and forward drive positions "D", "4", "3", "2", and "L". When the shift lever 72 is set at the positions "P" and "N", the neutral stage is established as the non-drive gear stage for interrupting the power transmission. At the position "P", the drive wheels are mechanically prevented from rotating by a mechanical parking mechanism.

FIG. 3 is a block diagram that shows control systems provided in the vehicle for controlling the engine 10 and the automatic transmission 14 as shown in FIG. 1. In the control system, an operation amount of an accelerator pedal 50 (opening degree of the accelerator), that is, Acc is detected by an accelerator pedal operation amount sensor 51. The accelerator pedal 50 is depressed by the vehicle operator in accordance with an output amount required by the vehicle operator. The accelerator pedal 50 corresponds to the accelerator operation member, and the accelerator operation amount Acc corresponds to a required output amount. An intake pipe of the engine 10 is provided with an electronic throttle valve 56 having its opening degree $\theta_{TH}$ changed by a throttle actuator 54. Further provided are an engine speed sensor 58 for detecting the engine speed NE of the engine 10, an intake air amount sensor 60 for detecting the intake air amount Q of the engine 10, an intake air temperature sensor 62 for detecting the temperature $T_A$ of the intake air, a throttle sensor 64 with an idle switch for detecting the fully closed (idling) state of the electronic throttle valve 56 and its opening degree $\theta_{TH}$, a vehicle speed sensor 66 for detecting the rotational speed $N_{OUT}$ (corresponding to the rotational speed of the output shaft) of the output gear 34, which corresponds to the vehicle speed V, a coolant temperature sensor 68 for detecting the coolant temperature Tw of the engine 10, a brake switch 70 for detecting whether or not the foot brake has been operated, a lever position sensor 74 for detecting the lever position (operating position) $P_{SH}$ of the shift lever 72, a turbine rotational speed sensor 76 for detecting the turbine rotational speed NT, an AT oil temperature sensor 78 for detecting the AT oil temperature $T_{OIL}$ as the temperature of work fluid within the hydraulic control circuit 98, and an ignition switch 82, respectively. The aforementioned sensors output signals representing the engine speed NE, intake air amount Q, intake air temperature $T_A$, throttle valve opening degree $\theta_{TH}$, vehicle speed V (rotational speed of output shaft $N_{OUT}$), engine coolant temperature Tw, presence or absence of the braking operation, lever position $P_{SH}$ of the shift lever 72, the turbine rotational speed NT, AT oil temperature $T_{OIL}$, and the operating position of the ignition switch 82 so as to be supplied to an electronic control unit 90. The turbine rotational speed NT is equivalent to the rotational speed of the input shaft 32 as the input member (input shaft rotational speed $N_{IN}$).

Figure 5:
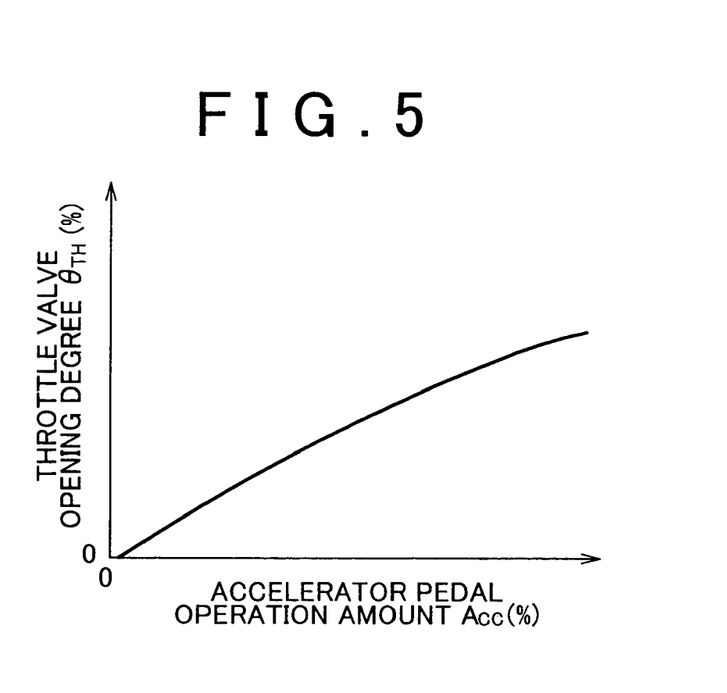
FIG. 5 is a graph showing an exemplary relationship between an accelerator pedal operation amount Acc used for the throttle control executed by the electronic control unit shown in FIG. 3 and the throttle valve opening degree eTH.

The electronic control unit 90 includes a microcomputer provided with a CPU, a RAM, a ROM, an I/O interface and the like. The CPU processes signals in accordance with the program preliminarily stored in the ROM while using a temporary data storage function of the RAM to execute output control of the engine 10 or the shift control of the automatic transmission 14. The CPU may be divided into sections for controlling the engine and the shifting if needed. Under the output control of the engine 10, the throttle actuator 54 executes the control of the electronic throttle valve 56, and a fuel injection valve 92 is controlled for a fuel injection amount control, and an ignition unit 94 such as an igniter is controlled for controlling an ignition timing. Under the control of the electronic throttle valve 56, the throttle actuator 54 is driven based on the actual accelerator pedal operation amount Acc derived from the relationship shown in FIG. 5, for example, to increase the throttle valve opening degree $\theta_{TH}$ as the accelerator pedal operation amount Acc increases. Upon start-up of the engine 10, a starter (electric motor) 96 performs a cranking operation.

Figure 6:
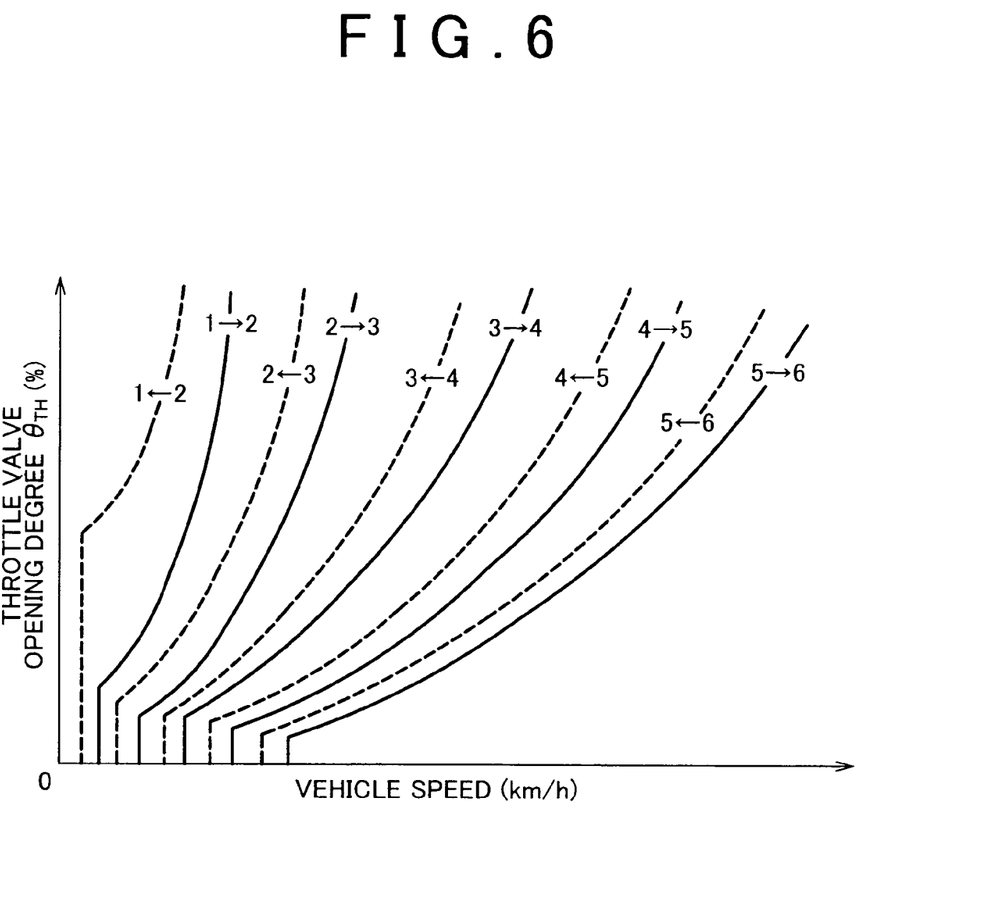
FIG. 6 is a graph showing an exemplary shift chart (map) used for the shift control of the automatic transmission executed by the electronic control unit shown in FIG. 3.

Under the shift control of the automatic transmission 14, the gear stage to be shifted therein is determined based on the actual throttle valve opening degree $\theta_{TH}$ and the vehicle speed V derived from a shift graph (shift map) preliminarily stored as shown in FIG. 6, that is, the shift determination, from the present stage to the one to be shifted, is made. Executed are shifting output for starting the shifting operation from the present gear stage to the determined gear stage, and continuous change of the electricity application state of the linear solenoid valves SL1 to SL5 of the hydraulic control circuit 98 so as to prevent the shift shock caused by the change in the driving force, and deterioration in the durability of the friction material. The solid line and broken line of the graph shown in FIG. 6 represent the upshift operation and the downshift operation, respectively. As the vehicle speed decreases and the throttle valve opening degree $\theta_{TH}$ increases the next lower gear stage with a greater gear ratio is selected. The numbers "1" to "6" correspond to the "1st" to "6th" stages, respectively.

Figure 7:
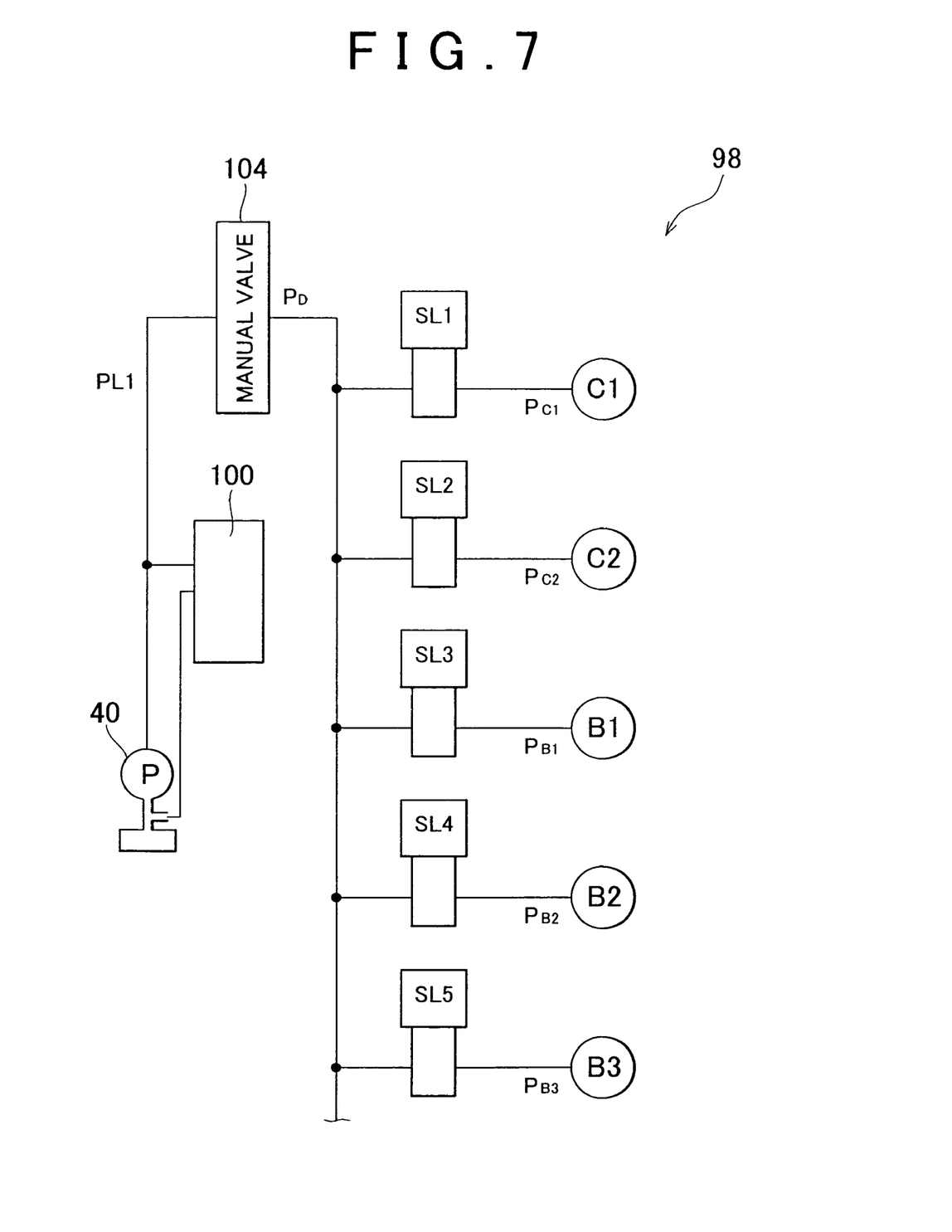
FIG. 7 is a circuit diagram of the hydraulic control circuit shown in FIG. 3 with respect to the section that relates to the shift control of the automatic transmission.

FIG. 7 shows an essential portion of the hydraulic control circuit 98. The work fluid is pressurized by an oil pump 40 and the pressure is regulated to a first line pressure PL1 by a first pressure relief valve. The oil pump 40 may be a mechanical pump that is driven by the engine 10 to rotate. The first pressure relief valve 100 serves to regulate the first line pressure PL1 in accordance with the turbine torque TT, that is, the input torque $T_{IN}$ of the automatic transmission 14 or the throttle valve opening degree $\theta_{TH}$ as the substitute value. The first line pressure PL1 is supplied to a manual valve 104 interlocked with the shift lever 72. When the shift lever 72 is operated at the position D, the manual valve 104 supplies the forward position pressure $P_D$ equivalent to the first line pressure PL1 to the linear solenoid valves SL1 to SL5. The linear solenoid valves SL1 to SL5 are arranged in accordance with the clutches C1, C2, and the brakes B1 to B3, respectively. The electricity application state is controlled in accordance with the drive signal output from the electronic control unit 90 such that the respective engagement pressures $P_{C1}$, $P_{C2}$, $P_{B1}$, $P_{B2}$, $P_{B3}$ are controlled independently. This makes it possible to selectively establish either one of the first gear stage "1 st" to the sixth gear stage "6th" selectively.

Figure 8:
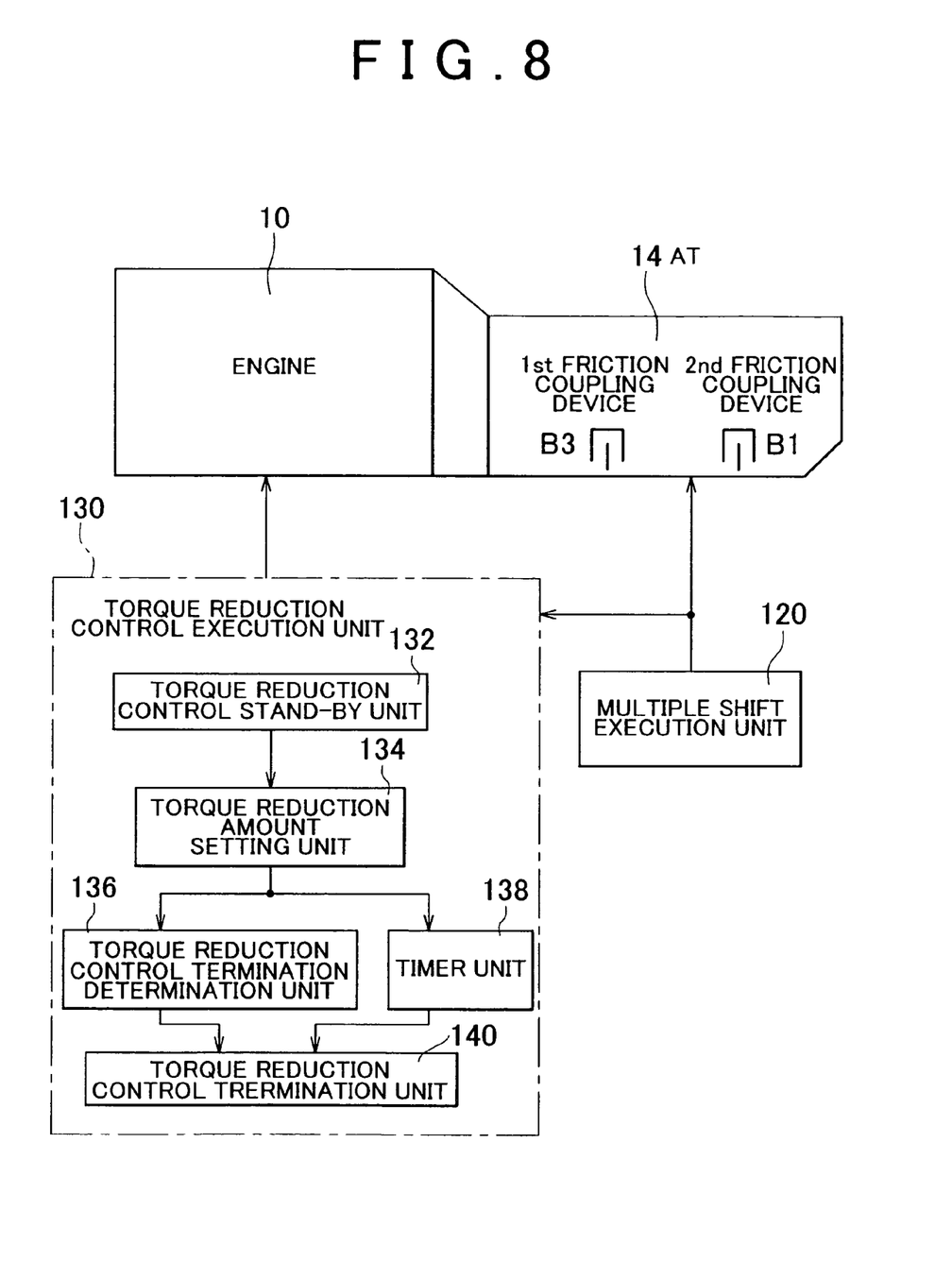
FIG. 8 is a block diagram for explaining the function performed for the 3rd to 2nd downshift in response to the 3rd to 2nd downshift determination made in the course of the 4th to 3rd downshift operation under the shift control of the automatic transmission executed by the electronic control unit shown in FIG. 3.

FIG. 8 is a block diagram representing a function for executing a multiple shift control among various control functions of the electronic control unit 90. Provided are a multiple shift execution unit 120 with respect to the shift control of the automatic transmission 14, and a torque reduction control execution unit 130 with respect to the torque reduction control of the engine 10. The first downshift determination is made in accordance with the shift map, shown in FIG. 6, when, for example, the vehicle speed V is reduced while coasting (accelerator pedal set OFF). At such time, the accelerator pedal 50 is not depressed and the first downshift engages either a clutch C or a brake B. If the accelerator pedal 50 is then depressed during the first downshift, a second downshift determination is made in accordance with the shift map shown in FIG. 6. In response to the second downshift determination, the multiple shift execution unit 120 immediately begins the second downshift and begins disengaging the friction coupling device that was being engaged by the first downshift and instead beings engaging the other friction coupling device of either the clutch C or the brake B. For example, when the 4th to 3rd downshift determination is made to perform the 4th to 3rd downshift in accordance with the shift map shown in FIG. 6, such as when the vehicle is reducing speed while coasting, the 4th to 3rd downshift is performed to disengage the second clutch C2 and to engage the third brake B3. When the accelerator pedal 50 is depressed during execution of the 4th to 3rd downshift, and the 3rd to 2nd downshift determination is made to perform the 3rd to 2nd downshift in accordance with the shift map shown in FIG. 6, the 3rd to 2nd downshift is performed to disengage the 3rd brake B3 that is about to be engaged and to engage the first brake B1. The same operation is performed when the 5th to 4th downshift determination is made during execution of the 6th to 5th downshift, or when the 2nd to 1st downshift determination is made during execution of the 3rd to 2nd downshift.

Figure 9:
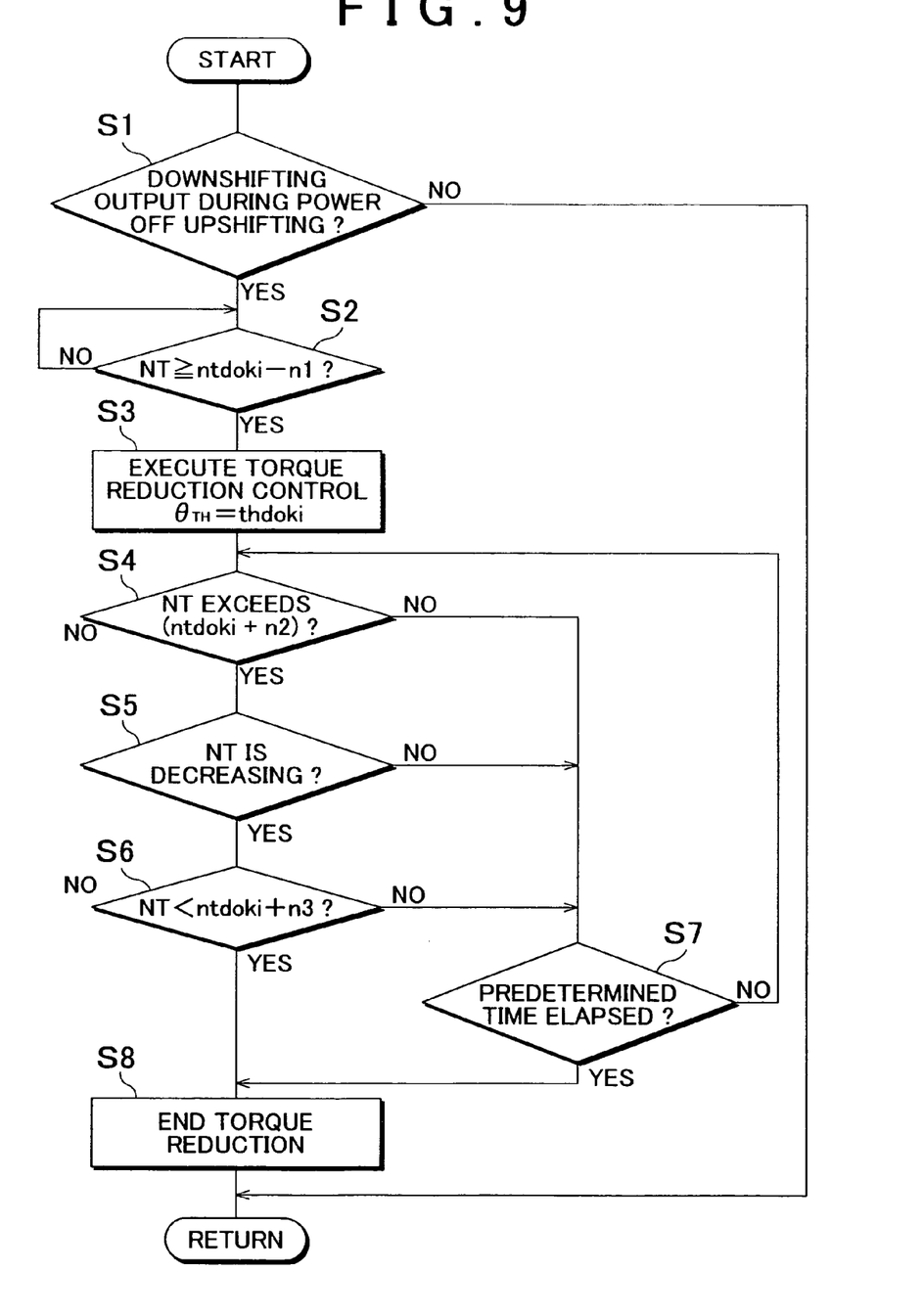
FIG. 9 is a flowchart representing the process executed by the torque reduction control execution unit shown in FIG. 8.

The torque reduction control execution unit 130, which executes the torque reduction control to decrease temporarily the torque of the engine 10 during the multiple shift performed by the multiple shift execution unit 120, functionally includes a torque reduction control stand-by unit 132, a torque reduction amount setting unit 134, a torque reduction control termination unit 136, a timer unit 138, and a torque reduction control termination unit 140 for processing signals in accordance with the flowchart shown in FIG. 9. Step S2 of the flowchart in FIG. 9 functionally corresponds to the torque reduction control stand-by unit 132, step S3 corresponds to the torque reduction amount setting unit 134, steps S4 to S6 correspond to the torque reduction control termination unit 136, step S7 corresponds to the timer unit 138, and step S8 corresponds to the torque reduction control termination unit 140, respectively.

Figure 10:
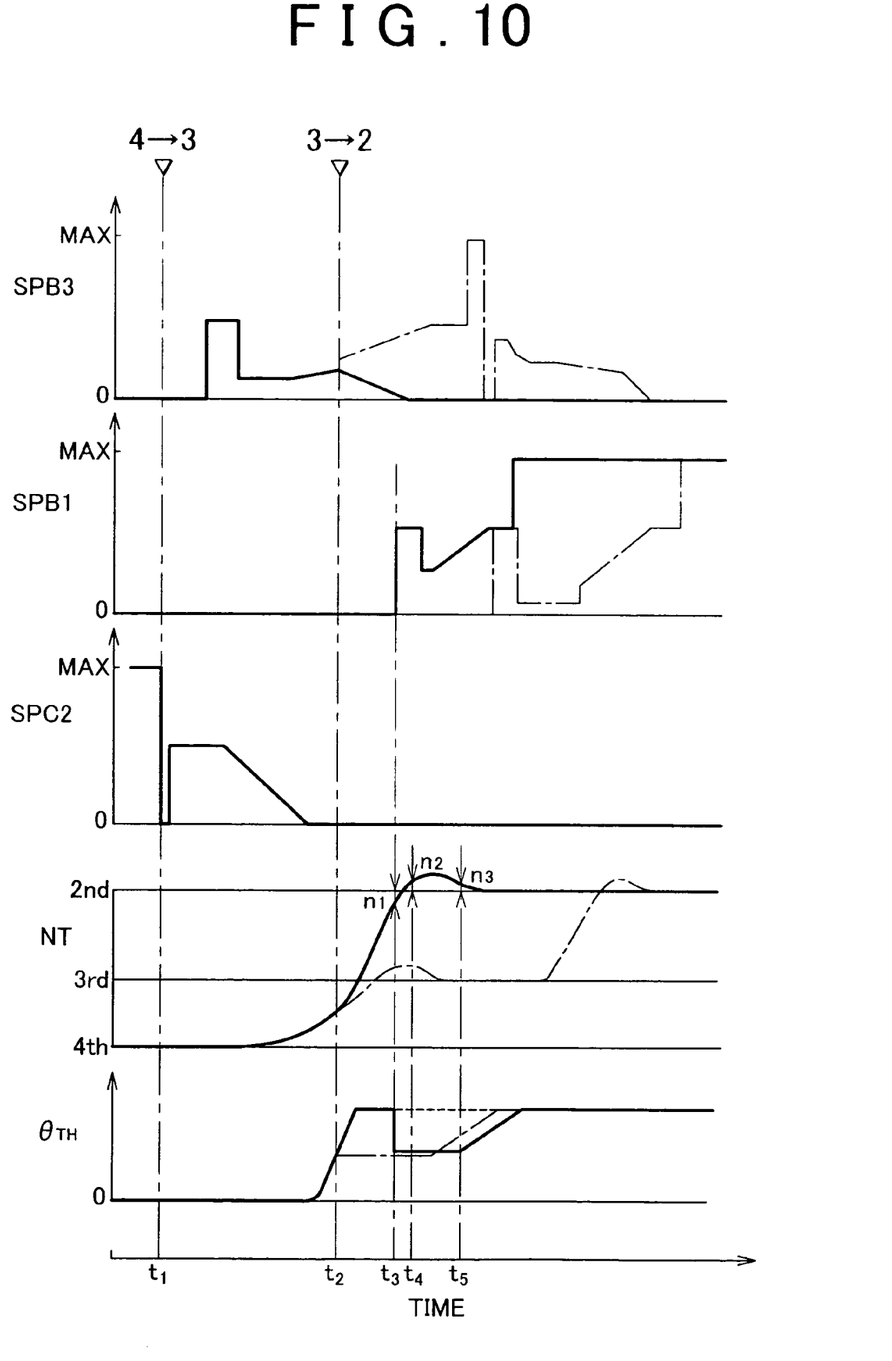
FIG. 10 is an exemplary timing chart of the torque reduction control executed

FIG. 10 shows an exemplary timing chart of a signal processing in accordance with the flowchart of FIG. 9 for performing the 3rd to 2nd downshift in response to the 3rd to 2nd downshift determination made during the 4th to 3rd downshift as one of the multiple shift operations. The term "SPB3" shown in FIG. 10 refers to a drive signal for hydraulic control with respect to the linear solenoid valve SL5 that directly controls the engagement pressure $P_{B3}$ of the third brake B3. The term "SPB1" refers to a drive signal for hydraulic control with respect to the linear solenoid valve SL3 that directly controls the engagement pressure $P_{B1}$ of the first brake B1. The term "SPC2" refers to a drive signal for hydraulic control with respect to the linear solenoid valve SL2 that directly controls the engagement pressure $P_{C2}$ of the second clutch C2. The actual engagement pressures $P_{B3}$, $P_{B1}$, and $P_{C2}$ change at timings behind the drive signals SPB3, SPB1, and SPC2, respectively. Each of those terms, "2nd", "3rd", and "4th" on the vertical axis of the turbine rotational speed NT represents the synchronous rotational speed of the respective gear stages, which are obtained by multiplying the gear ratio of the gear stage by the vehicle speed, that is, the output shaft rotational speed $N_{OUT}$. In the case where the turbine rotational speed NT accords with the corresponding synchronous rotational speed, the gear stage is established. In the case where the turbine rotational speed is at the intermediate position of the synchronous rotational speed, the gear is shifted in the course of the shift operation.

At a time point t1 shown in the timing chart of FIG. 10, the 4th to 3rd downshift determination is made in accordance with the shift map shown in FIG. 6 when the vehicle speed V is reduced, for example, while coasting with the accelerator pedal set OFF. At the time point, the 4th to 3rd downshift is immediately started to control such that the second clutch C2 is disengaged, and the control for engaging the third brake B3 is started at a predetermined timing. When the accelerator pedal 50 is depressed, the throttle valve opening degree $\theta_{TH}$ is subjected to the opening control before full engagement of the third brake B3, the 3rd to 2nd downshift determination is made in accordance with the shift map shown in FIG. 10 at a time point t2. The 3rd to 2nd downshift is then immediately started to disengage the third brake B3 and engage the first brake B1 at a predetermined time. The drive signal SPB3 for hydraulic control of the third brake B3 is gradually decreased for the purpose of preventing any sharp loss in torque owing to disengagement of the third brake B3. In the course of the 3rd to 2nd downshift, the torque reduction control of the engine 10 is executed in accordance with the process of the flowchart shown in FIG. 9. In the multiple shifting operations shown in FIG. 10, the 4th to 3rd downshift corresponds to the first downshift, and the 3rd to 2nd downshift corresponds to the second downshift. The third and the first brakes B3 and B1 correspond to the first and the second friction coupling devices, respectively. The graph indicated by a chain line represents the 3rd to 2nd downshift which is started after an elapse of time until completion of the 4th to 3rd downshift irrespective of the 3rd to 2nd downshift determination.

The control executed in response to the 3rd to 2nd downshift determination made during the 4th to 3rd downshift as shown in FIG. 10 will be described referring to the flowchart shown in FIG. 9. In step S1, it is determined whether the downshift operation is output during power OFF downshift operation, that is, the command for the 3rd to 2nd downshift that disengages the third brake B3 has been output for performing the 3rd to 2nd downshift by the multiple shift execution unit 120 in response to the 3rd to 2nd downshift determination made before full engagement of the third brake B3 during the 4th to 3rd downshift operation. When the command for the 3rd to 2nd downshift is output by the multiple shift execution unit 120, the process proceeds to step S2 where it is determined whether the turbine rotational speed NT is increased to be equal to or higher than a first determination speed (ntdoki−n1), which is obtained by subtracting a predetermined value n1 from the synchronous rotational speed ntdoki after the downshift. If the relationship of NT> (ntdoki−n1) is established, the process proceeds to step S3 where the torque reduction control is executed. During the 3rd to 2nd downshift, the turbine rotational speed NT must be increased to the synchronous rotational speed ntdoki. Accordingly, the torque reduction control is kept in stand-by state until the turbine rotational speed NT becomes equal to or higher than the predetermined first determination speed (ntdoki−n1) rather than executing the torque reduction control immediately. The synchronous rotational speed ntdoki in this case corresponds to the synchronous rotational speed at the "2nd" gear stage, which is equal to the synchronous rotational speed as "2nd" on the vertical axis of the turbine rotational speed NT shown in FIG. 10.

The first determination speed (ntdoki−n1) represents the rotating speed at which the torque reduction control is started. The predetermined value n1 is preliminarily set through experiments in consideration for the torque response delay of the engine 10, inertia of the engine 10, the opening degree "thdoki" of the electronic throttle valve 56 during closing operation under the torque reduction control in step S3 so as to increase the turbine rotating speed NT quickly and to promote the downshifting operation smoothly while preventing the overspeeding of the engine 10 or shift shock. The predetermined value n1 may be set to a constant value for each downshift pattern. However, it may be calculated with a predetermined equation or a data map in which the engine speed NE and the AT oil temperature $T_{OIL}$, and the like, when starting the 3rd to 2nd downshift operation are set as parameters. At a time point t3 shown in FIG. 10, the torque reduction control starts in step S3 resulting from the positive determination, that is, YES obtained in step S2 as the turbine rotational speed NT increases to be equal to or higher than the first determination speed (ntdoki−n1). As FIG. 10 clearly shows, in the embodiment, when the positive determination, that is, YES is obtained in step S2 at a time point t3, the drive signal SPB1 for hydraulic control is output to start engaging the first brake B1. The first brake B1 may also start engaging in response to the determination other than the determination made in step S2.

The torque reduction control in step S3 is executed by reducing the throttle valve opening degree $\theta_{TH}$ of the engine 10 to the value "thdoki" at which the engine 10 to only outputs sufficient torque to increase the turbine rotational speed NT to the synchronous rotational speed ntdoki after the downshift. Under the torque reduction control, the rate of increase in the turbine rotational speed NT is suppressed to prevent the overspeeding of the engine 10 and shift shock. The aforementioned opening degree $\theta_{TH}$ under the closing control operation is preliminarily set through experiments in consideration for the torque response delay of the engine 10, inertia of the engine 10, and the predetermined value n1 in step S2 so as to make sure that the turbine rotational speed NT exceeds the synchronous rotational speed ntdoki. The opening degree $\theta_{TH}$ under the closing control operation may be set to a constant value for each downshift pattern. However, it may be calculated with a predetermined equation or a data map in which the engine speed NE and the AT oil temperature $T_{OIL}$, and the like, when starting, for example, the 3rd to 2nd downshift operation are set as parameters.

In subsequent step S4, it is determined whether the turbine rotational speed NT exceeds a second determination speed (ntdoki+n2), which is obtained by adding a predetermined value n2 to the synchronous rotational speed ntdoki after the downshift. If the relationship of NT>(ntdoki+n2) is established, the process proceeds to step S5. If the relationship of NT<(ntdoki+n2) is established, the process proceeds to step S7. In step S4, it is determined whether the turbine rotational speed NT has been increased to make sure to exceed the synchronous rotational speed ntdoki. The predetermined value n2 may be set to a constant value for each downshift pattern. However, it may be calculated with a predetermined equation or a data map in which the engine speed NE, and the AT oil temperature $T_{OIL}$, and the like, are set as parameters. In step S7, it is determined whether a predetermined time has elapsed from the start-up of the torque reduction control, that is, a predetermined time has elapsed from the time point t3. The control process in step S4 and subsequent steps will be repeatedly executed until the elapse of the predetermined time.

When the positive determination, that is, YES, is obtained in step S4 as the turbine rotational speed NT exceeds the second determination speed (ntdoki+n2), the process proceeds to step S5 and subsequent steps to be executed. The positive determination, YES, obtained in step S4 is stored in the RAM. In the subsequent cycle, if the process in step S4 is executed subsequent to step S7, the determination of YES obtained in step S4 is maintained even if the relationship of NT<(ntdoki+n2) is established. Accordingly the process in step S5 and subsequent steps may be executed. At a time point t4 shown in FIG. 10, YES is obtained in step S4 as the turbine rotational speed NT exceeds the second determination speed (ntdoki+n2) so as to execute the process in step S5 and subsequent steps.

In step S5, it is determined whether the turbine rotational speed NT is decreased through engagement of the brake B1 during the 3rd to 2nd downshift, that is, whether the turbine rotational speed NT is decreasing over a predetermined period of time. If it is determined that the turbine rotational speed NT is decreasing, the process proceeds to step S6. In step S6, it is determined whether the turbine rotational speed NT is below the third determination speed (ntdoki+n3), obtained by adding a predetermined value n3 to the synchronous rotational speed ntdoki, after the downshift. Execution of the process only in step S6 may cause the erroneous determination owing to detection error of the turbine rotational speed sensor 76, noise resulting from the fluctuation in the rotation and the like. Accordingly, the determination is made with respect to the decrease in step S5 based on three or more sampling values (values obtained by the respective cycles) of the latest recorded values of the turbine rotational speed NT for a predetermined time period by determining whether those values show the gradual decrease in sequential order, that is, the downward trend. When it is determined that the turbine rotational speed NT shows is decreasing in step S5, and the relationship of NT<(ntdoki+n3) is established in step S6, the process proceeds to step S8. In step S8, the process ends and the throttle valve opening degree $\theta_{TH}$ is increased to the throttle valve opening degree $\theta_{TH}$ corresponding to the present accelerator pedal operation amount Acc at a predetermined increase rate.

The third determination speed (ntdoki+n3) is set for smoothly generating the torque after completion of the 3rd to 2nd downshift while preventing the overspeeding of the engine 10 due to the ending of the torque reduction control. The predetermined value n3 may be determined empirically in consideration for the torque response delay of the engine 10, and inertia of the engine 10. The predetermined value n3 may be set to a constant value for each downshift pattern. However, it may be calculated with a predetermined equation or a data map in which the engine speed NE, and the AT oil temperature $T_{OIL}$ when starting the 3rd to 2nd downshift operation are set as parameters. In the embodiment, the predetermined value n3 is smaller than the predetermined value n2, and the third determination speed (ntdoki+n3) is lower than the second determination speed (ntdoki+n2). At a time point t5 shown in FIG. 10, the torque reduction control ends in step S8 resulting from the positive determination, that is, YES obtained in step S6 as the turbine rotational speed NT is decreased to be lower than the third determination speed (ntdoki+n3). The throttle valve opening degree $\theta_{TH}$ is increased at a predetermined increase rate. The broken line at the section of the throttle valve opening degree $\theta_{TH}$ represents the throttle valve opening degree $\theta_{TH}$ corresponding to the accelerator pedal operation amount Acc.

The condition for making each determination in steps S4 to S6 YES (positive), that is, the condition to be established when the turbine rotational speed NT exceeds the second determination speed (ntdoki+n2), and decreases to be lower than the third determination speed (ntdoki+n3) corresponds to the condition for ending the torque reduction control of the engine 10.

Meanwhile the process in step S7, which determines whether a predetermined time has elapsed after the torque reduction control started in step S3, is executed repeatedly until YES is obtained in step S6. When it is determined that the predetermined time has elapsed, the process in step S8 may be executed even before YES (positive determination) is obtained in each of steps S4 to S6 so as to forcibly complete the torque reduction control. The process in step S7 is executed to prevent continued operation of the engine 10 in the reduced torque state when the 3rd to 2nd downshift cannot be performed appropriately owing to a certain abnormality, that is, the torque reduction control termination condition, where the turbine rotational speed NT exceeds the second determination speed (ntdoki+n2), and decreases to be lower than the third determination speed-(ntdoki+n3) is unsatisfied. The predetermined time may be set to be longer than the time required for the appropriate performance of the 3rd to 2nd downshift operation. The predetermined time may be set to a constant value for each downshift pattern. However, it may be calculated with a predetermined equation or a data map in which the engine speed NE, the AT oil temperature $T_{OIL}$, and the opening degree "thdoki" in the closing control operation when starting the 3rd to 2nd downshift are set as parameters.

In the shift control apparatus according to the embodiment, when the second downshift (3rd to 2nd downshift shown in FIG. 10) determination is made during the first downshift (4th to 3rd downshift shown in FIG. 10), the second downshift is immediately started, and the torque reduction control is kept in stand-by state until the turbine rotational speed NT becomes equal to or higher than the first determination speed (ntdoki−n1) which is lower than the synchronous rotational speed ntdoki. The torque generated by the engine 10 allows the turbine rotational speed NT to increase quickly. When the turbine rotational speed NT reaches the first determination speed (ntdoki−n1), the torque reduction control starts. This makes it possible to obtain the desired driving force through a quick second downshift while preventing the overspeeding of the engine 10.

The torque reduction control is executed by reducing the throttle valve opening degree $\theta_{TH}$ to the value "thdoki", at which the engine 10 only outputs sufficient torque to increase the turbine rotational speed NT to the synchronous rotational speed ntdoki after the downshift. This makes it possible to obtain further improved shift response by smoothly increasing the turbine rotational speed NT to the synchronous rotational speed ntdoki by the engine torque while preventing the overspeeding of the engine 10.

In steps S4 to S6, it is determined whether the torque reduction control termination condition that the turbine rotational speed NT exceeds the second determination speed (ntdoki+n2) and decreases to be lower than the third determination speed (ntdoki+n3) is satisfied. When torque reduction control termination condition is satisfied, the torque reduction control ends. This makes it possible to generate the torque quickly after completion of the second downshift while preventing the overspeeding of the engine caused by ending the torque reduction control. As the torque reduction control termination condition is set such that the turbine rotational speed NT continues to decrease for a predetermined time, the erroneous ending of the torque reduction control owing to the detection error in the turbine rotational speed sensor 76, noise caused by the fluctuation in the rotation may be prevented to make sure to prevent the overspeeding of the engine 10.

In the embodiment, when the state in which torque reduction control termination condition is unsatisfied in steps S4 to S6 has been continued for a predetermined time or longer, YES (positive determination) is obtained in step S7, and the process proceeds to step S8 where the torque reduction control is forcibly ended. Accordingly in the case where the abnormality occurs in the second downshift operation to complete the shifting operation without satisfying the return condition, operation of the engine 10 under the torque reduction control is prevented from continuing for an extended time.

The embodiments of the invention have been described referring to the drawings. However, it is a mere example of the embodiment of the invention, which may be modified and improved within the scope of the invention.

What is claimed is:

1. A shift control apparatus that executes a shift control of an automatic transmission that changes a speed of a rotation transferred from a power source to an input member and outputs the rotation to a drive wheel, wherein in response to a second downshift determination made during a first downshift which engages a first friction coupling device, the shift control apparatus performs a second downshift operation which disengages the first friction coupling device, and engages a second friction coupling device, the shift control apparatus comprising:

a multiple shift execution unit that starts the second downshift operation in response to the second downshift determination; and a torque reduction control execution unit that executes a torque reduction control, after starting the second downshift operation, for reducing a torque of the power source when a rotational speed of the input member is increased to be equal to or higher than a predetermined first determination speed that is lower than a synchronous rotational speed determined in accordance with a shift ratio of a gear stage after the second downshift.

2. The shift control apparatus according to claim 1, wherein:

the power source comprises an internal combustion engine with an electronically controlled throttle valve; and the torque reduction control execution unit executes a control to reduce the opening degree of the throttle valve to a value at which the internal combustion engine outputs sufficient torque to increase the rotational speed of the input member to the synchronous rotational speed.

3. The shift control apparatus according to claim 1, wherein the torque reduction control execution unit ends the torque reduction control when a torque reduction control termination condition is satisfied, where the torque reduction control termination condition is satisfied when, first, the rotational speed of the input member exceeds a predetermined second determination speed higher than the synchronous rotational speed, next, the rotational speed of the input member decreases for a first predetermined time period, and the rotational speed of the input member reaches to be lower than a predetermined third determination speed higher than the synchronous rotational speed.

4. The shift control apparatus according to claim 3, wherein the torque reduction control execution unit forcibly ends the torque reduction control when the torque reduction control termination condition is not satisfied for at least a second predetermined time period.

5. A method of controlling an automatic transmission, which changes a speed of a rotation transferred from a power source to an input member and outputs the rotation to a drive wheel, wherein, in response to a second downshift determination made during a first downshift, which engages a first friction coupling device, a second downshift operation, which disengages the first friction coupling device and engages a second friction coupling device, is performed; the method comprising:

starting the second downshift operation in response to the second downshift determination executing a torque reduction control, after starting the second downshift operation, to reduce a torque output of the power source when a rotational speed of the input member is increased to be equal to or higher than a predetermined first determination speed that is lower than a synchronous rotational speed determined in accordance with a shift ratio of a gear stage after the second downshift.

6. The method according to claim 5, wherein:

the power source comprises an internal combustion engine with an electronically controlled throttle valve; and the torque reduction control reduces the opening degree of the throttle valve to a value at which the internal combustion engine outputs only sufficient torque to increase the rotational speed of the input member to the synchronous rotational speed.

7. The method according to claim 5, further comprising:
ending the torque reduction control when a torque reduction control termination condition is satisfied, where the torque reduction control termination condition is satisfied when, first, the rotational speed of the input member exceeds a predetermined second determination speed higher than the synchronous rotational speed, next, the rotational speed of the input member decreases for a first predetermined time period, and the rotational speed of the input member reaches to be lower than a predetermined third determination speed higher than the synchronous rotational speed.

8. The method according to claim 7, further comprising:
ending the torque reduction control forcibly when the torque reduction control termination condition is not satisfied for at least a second predetermined time period.

* * * * *